Figure 1:
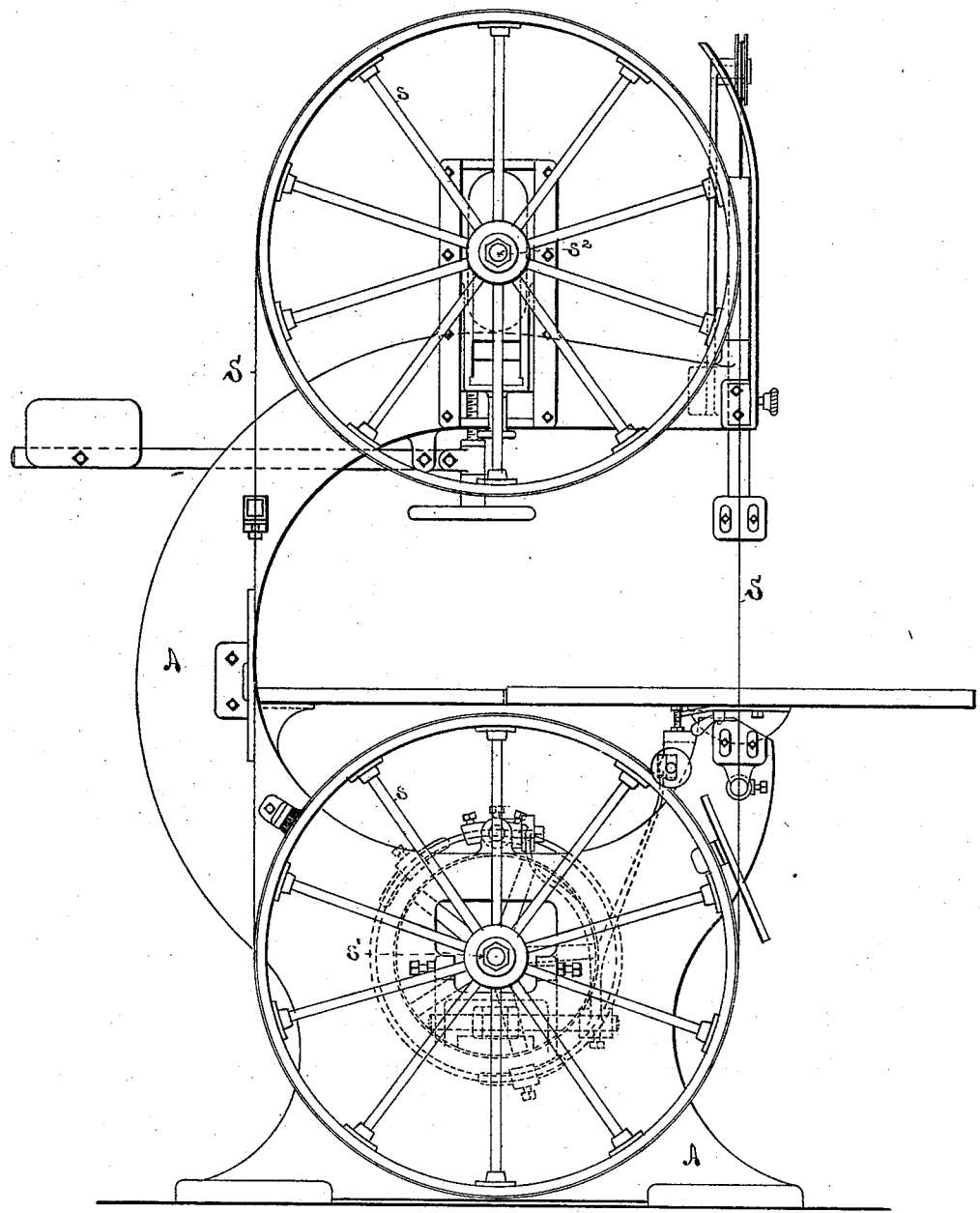

(No Model.)

J. R. THOMAS.

BAND SAWING MACHINE.

No. 373,031. 5 Sheets—Sheet 1.

Patented Nov. 8, 1887.

WITNESSES:

INVENTOR
John R. Thomas

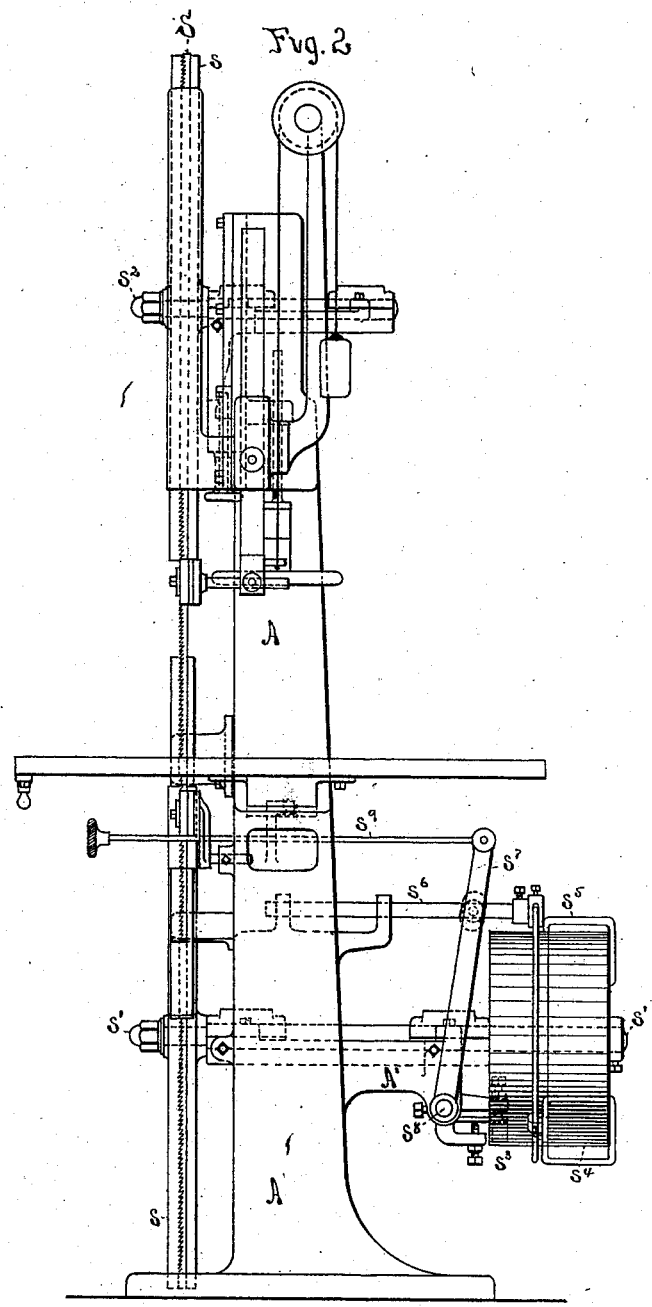

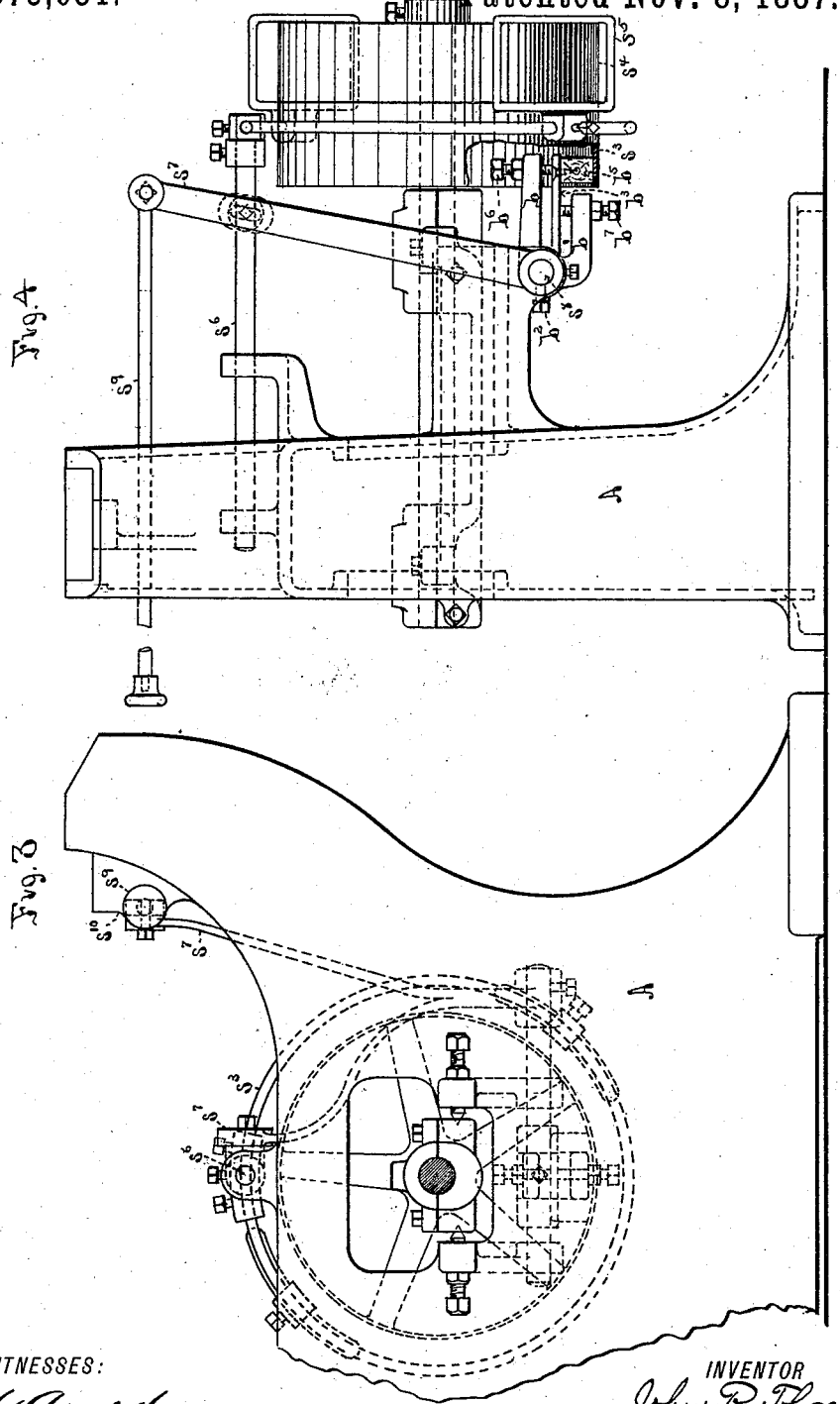

(No Model.) 5 Sheets—Sheet 4.
J. R. THOMAS.
BAND SAWING MACHINE.
No. 373,031. Patented Nov. 8, 1887.
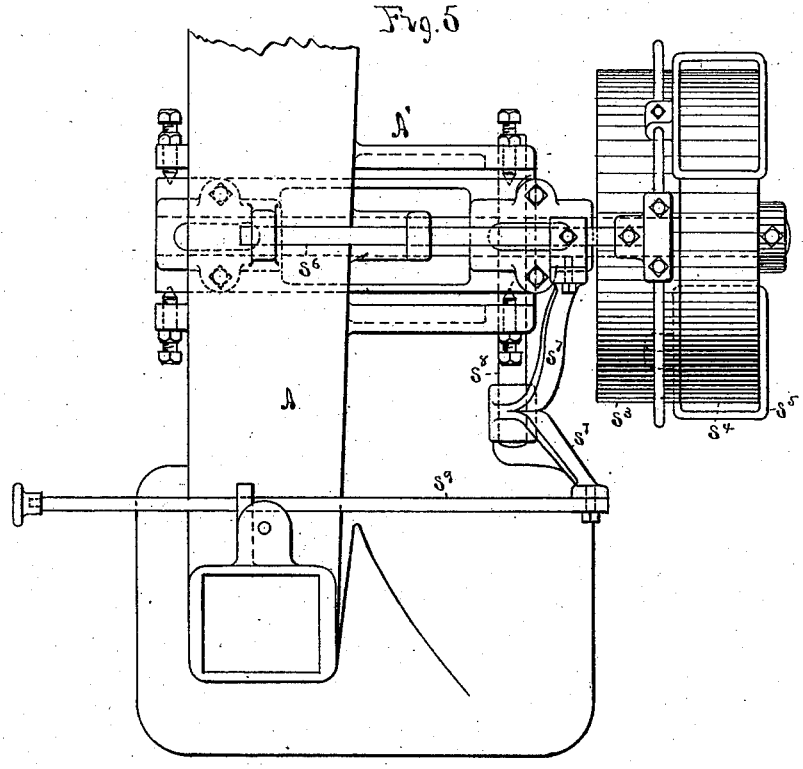
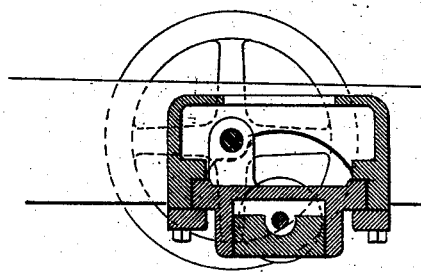
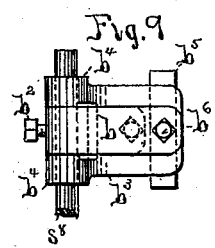
WITNESSES:
INVENTOR
John R. Thomas (No Model.) 5 Sheets—Sheet 5.
J. R. THOMAS.
BAND SAWING MACHINE.
No. 373,031. Patented Nov. 8, 1887.
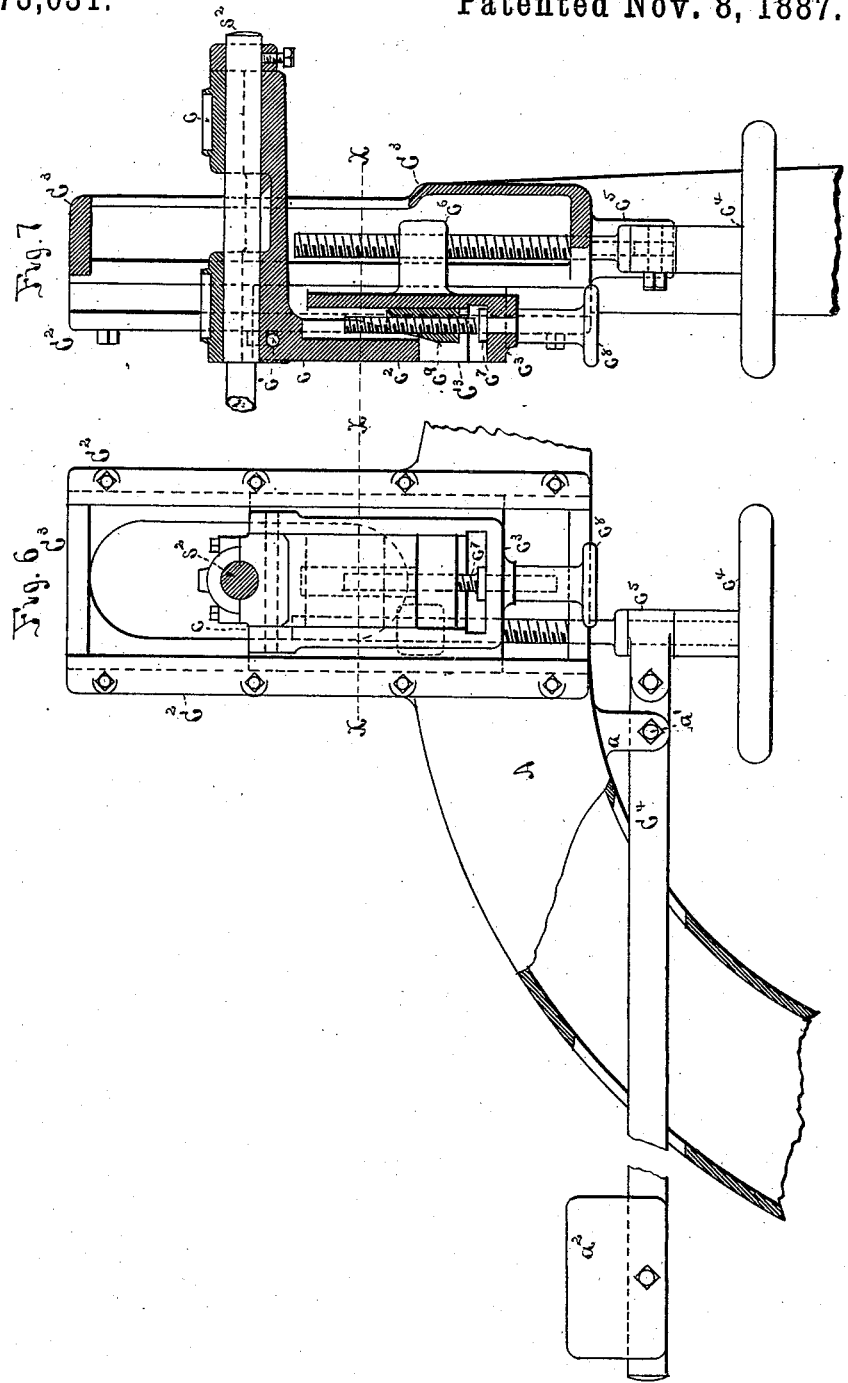
WITNESSES:
INVENTOR
John R. Thomas

UNITED STATES PATENT OFFICE.

JOHN R. THOMAS, OF BOSTON, MASSACHUSETTS, ASSIGNOR TO THE S. A. WOODS MACHINE COMPANY, OF MASSACHUSETTS.

BAND SAWING-MACHINE.

SPECIFICATION forming part of Letters Patent No. 373,031, dated November 8, 1887.

Application filed August 11, 1886. Serial No. 210,602. (No model.)

*To all whom it may concern:*

Be it known that I, JOHN R. THOMAS, of Boston, in the county of Suffolk and State of Massachusetts, have invented a new and useful Improvement in Band Sawing-Machines, of which the following is a specification.

My invention relates to band sawing-machines; and it consists in certain new and useful constructions and combinations of the several parts thereof, substantially as hereinafter described and claimed.

In the drawings, Figure 1 is a side elevation of a band sawing-machine constructed with my improvements. Fig. 2 is a front elevation of the same. Fig. 3 is an enlarged view of a portion of Fig. 1 with the band-saw wheel and saw removed. Fig. 4 is an enlarged view of a portion of Fig. 2 with the band-saw wheel and saw removed, and with some of the parts broken away to show their mode of operation. Fig. 5 is a top plan view of Fig. 4. Fig. 6 is an enlarged view of the head which supports the upper band-saw wheel with the wheel and saw removed. Fig. 7 is a transverse central section of the head shown in Fig. 6. Fig. 8 is a transverse horizontal section of same on the line X X of Figs. 6 and 7. Fig. 9 is a top plan view of the brake-shoe and its connections detached from the machine.

A is the frame-work of the machine which supports the operating parts. S is the band-saw, which passes around the wheels $s\,s$, mounted upon axes $s'\,s^2$. The lower axis, $s'$, passes through the frame-work A, in which it is mounted in bearings, and has on its opposite end from the band-saw wheel $s$ the tight and loose pulleys $s^3\,s^4$, attached in the usual manner. The belt-shipper $s^5$ is attached to the horizontal rod $s^6$, which slides back and forth in bearings attached to the frame, as shown. This rod $s^6$ is moved back and forth by the lever $s^7$, which is attached to the rod by a pin and slot and is pivoted on the shaft $s^8$.

To the upper end of the lever $s^7$ is pivoted the piston-rod $s^9$, which extends horizontally across the frame-work A, sliding loosely through a bearing, $s^{10}$, Fig. 3, therein, and terminates in an enlargement or head just beneath the table and convenient to the operator standing thereat. By sliding the piston $s^9$ horizontally in one direction or the other the belt will be thrown upon the tight pulley $s^3$ or loose pulley $s^4$, as may be desired. The lever $s^7$ is bifurcated or two-branched, as shown in Fig. 5, one branch or arm having the piston $s^9$ attached to its upper end, and the other the rod $s^6$. The shaft $s^8$ is journaled in a bracket, A', extending outwardly from the frame A, and has attached to it, opposite the center of the tight pulley $s^3$, the arms $b\,b'$, by the set-screw $b^2$, so that the arms will move with the shaft $s^8$ and lever $s^7$, Figs. 4 and 9.

Between the arms $b\,b'$ the tongue $b^3$ swings loosely on the shaft on sleeves $b^4\,b^4$, surrounding the shaft on each side of the arms $b\,b'$. This tongue $b^3$ extends within the flange of the tight pulley $s^3$, and carries on its outer end the shoe $b^5$ adjacent to the inner face of the pulley-flange. The arm $b$ is provided with a set-screw, $b^6$, bearing against the upper side of the swinging tongue $b^3$, and the arm $b'$ is also provided with a set-screw, $b^7$, passing through it and bearing against the lower side of the tongue $b^3$. By adjusting these set-screws the tongue $b^3$ and shoe $b^5$ have a limited adjustment to secure them in position with relation to the shaft $s^8$ and lever $s^7$, so that the shoe $b^5$ will be brought to bear upon the inner face of the tight pulley sooner or later in the movement of the lever $s^7$.

In use the set-screws $b^6\,b^7$ are so adjusted as to bring the brake-shoe $b^5$ to bear upon the inner face of the tight pulley as soon as the belt has been thrown from the latter upon the loose pulley, and as the brake-shoe wears away the adjustment of the set-screws is altered to bring its face to bear upon the tight pulley at this point in the movement of the lever $s^7$. By pressing upon the piston $s^9$, therefore, the movement which shifts the belt from the tight pulley $s^3$ to the loose pulley $s^4$ also brings the brake-shoe $b^5$ to bear upon the tight pulley and immediately stops the revolution of the latter and of the saw-wheel $s$, attached to the same shaft, $s^2$, thereby stopping the running of the saw.

In order to provide for the adjustment of the upper band-saw wheel, $s$, at any desired angle to have the saw run over it to the best advantage and accomplish this adjustment easily and accurately, it is found to be advantageous to adjust it while the saw is running, and I adopt the following construction of parts to do this: The upper band-saw-wheel shaft is mounted in bearings in a casting, $c$, Figs. 6, 7, 8, which is pivoted to the gate $C^3$, which slides up and down in the frame-head $C^2$ in the usual manner, by a pivot, $c'$, extending through the same from side to side. An arm or plate, $c^2$, projects downwardly from the casting $c$ on its front side nearest the saw. The gate $C^3$ carries a cross-bar, $c^3$, firmly attached to it, and it is raised up and down by the hand-wheel $c^4$, which is journaled in the end of lever $C^4$ at $c^5$, and has its shaft screw-threaded and passing through the ear $c^6$, attached to the gate $C^3$, the ear $c^6$ being screw-threaded to fit the thread on the shaft. The band-saw-wheel shaft $s^2$ is by this means raised and lowered vertically to tighten the band-saw.

In the center of the bar $c^3$, carried by the gate, is journaled a shaft, $c^7$, vertically, having on its lower end the hand-wheel $c^8$ and its upper part screw-threaded and passing through a piece of metal, $c^9$, which has a flat face on its back side, which bears against the gate $C^3$, and having its front side wedge-shaped where it bears against the downwardly-projecting arm $c^2$. When the hand-wheel $c^5$ is turned in one direction or the other, the wedge $c^9$ is moved up and down by the screw-thread upon its shaft $c^7$, and consequently swings the arm out or in and turns the casting $c$ upon its pivot $c'$, thus changing the plane of rotation of the band saw-wheel $s$, mounted upon the shaft $s^2$. The hand-wheel $c^8$ is within reach of the operator from the side of the frame opposite to the band-saw, and he can therefore turn it and shift the alignment of the wheel while the saw is running and while in a position to observe the effect of so shifting the alignment, which is of great advantage.

The lever $C^4$ is pivoted in an ear, $a$, which projects downward from the frame upon the pivot $a'$, and the lever extends through the frame and carries on its outer end the sliding weight $a^2$, by which the pressure upon the gate $C^3$ may be varied in the usual manner.

What I claim as new and of my invention is—

1. The combination of the tight pulley $s^3$, the shaft $s^8$, the belt-shipping lever $s^7$, and the arm $b^3$, attached to the shaft and carrying brake-shoe $b^5$, bearing against the inner face of the pulley, substantially as described.

2. The combination of the tight pulley $s^3$, the shaft $s^8$, the belt-shipping lever $s^7$, the arms $b\ b'$, provided with set-screws $b^6\ b^7$, and the arm $b^3$, located between the latter and carrying brake-shoe $b^5$, bearing against the pulley, substantially as described.

3. The combination of the band-saw-wheel shaft $s^2$, the pivoted casting $c$, carrying the shaft in its bearings and provided with the downwardly-projecting arm $c^2$, with the wedge $c^9$, bearing against the side of arm $c^2$ and its raising and lowering screw-shaft $c^7$, substantially as described.

4. The combination of the upper band saw-wheel shaft $s^2$, the casting $c$, carrying the shaft in its bearings and pivoted upon the transverse pivot $c'$, and provided with the downwardly-projecting arm $c^2$, the wedge $c^9$, moving vertically and bearing against the side of arm $c^2$, and its raising and lowering screw-shaft $c^7$, extending downward therefrom in a direction substantially vertical, and provided with the hand-wheel $c^8$ at its lower end, whereby the latter is brought within reach of the operator while standing in front of the saw-table, substantially as described.

JOHN R. THOMAS.

Witnesses:
W. U. AMSDEN,
G. L. PERKINS.